US010403924B2

(12) United States Patent
Kim et al.

(10) Patent No.: US 10,403,924 B2
(45) Date of Patent: Sep. 3, 2019

(54) RECHARGEABLE BATTERY

(71) Applicant: LG Chem, Ltd., Seoul (KR)

(72) Inventors: Kyung Min Kim, Daejeon (KR); Joo Hwan Sung, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/711,584

(22) Filed: Sep. 21, 2017

(65) Prior Publication Data

US 2018/0083305 A1 Mar. 22, 2018

(30) Foreign Application Priority Data

Sep. 21, 2016 (KR) ........................ 10-2016-0120492

(51) Int. Cl.
*H01M 10/04* (2006.01)
*H01M 2/10* (2006.01)

(52) U.S. Cl.
CPC ..... *H01M 10/0468* (2013.01); *H01M 2/1094* (2013.01); *H01M 10/045* (2013.01); *H01M 10/0431* (2013.01); *H01M 2220/30* (2013.01)

(58) Field of Classification Search
CPC ........... H01M 10/0468; H01M 10/045; H01M 10/0431; H01M 2/1094; H01M 2220/30
See application file for complete search history.

(56) References Cited

U.S. PATENT DOCUMENTS

2007/0154789 A1* 7/2007 Chang ..................... H01M 2/08 429/130
2013/0299064 A1* 11/2013 Kim ........................ H01M 2/10 156/83

FOREIGN PATENT DOCUMENTS

KR 20160010121 A 1/2016

* cited by examiner

*Primary Examiner* — Lisa S Park
(74) *Attorney, Agent, or Firm* — Mintz Levin Cohn Ferris Glovsky and Popeo, P.C.; Kongsik Kim; Jhongwoo Jay Peck

(57) ABSTRACT

A rechargeable battery comprises an electrode assembly having an electrode and a separator are alternately stacked and wound, a fixing tape attached to an exterior surface of the electrode assembly to prevent the electrode assembly from being unwound, and a battery case that receives the electrode assembly and the fixing tape therein. The fixing tape comprises a material that is expanded when an electrolyte is impregnated and absorbs an impact in the expanded state to buffer an impact applied to the electrode assembly.

10 Claims, 6 Drawing Sheets

RECHARGEABLE BATTERY

CROSS-REFERENCE TO RELATED APPLICATIONS

This application claims the priority of Korean Patent Application No. 10-2016-0120492 filed on Sep. 21, 2016, the disclosure of which is incorporated herein by reference.

TECHNICAL FIELD

The present disclosure relates to a rechargeable battery, and more particularity to a rechargeable battery that prevents a layered spiral arrangement type electrode assembly from being unwound and improves impact absorption

RELATED ART

As technology development and demands for mobile devices have increased demands for rechargeable batteries as energy source has rapidly increasing. Recently, extensive research has been conducted on rechargeable batteries due to the possibility of compact size and large capacity and unlike primarily batteries, they can be reused. Rechargeable batteries are classified into coin type batteries, cylindrical type batteries, prismatic type batteries, and pouch type batteries according to a shape of a battery case. Typically, rechargeable battery include an electrode assembly mounted in a battery case that is a chargeable and dischargeable power generating device having a stacked electrode and separator structure.

The electrode assembly is classified into a layer spherical arrangement (e.g., jelly-roll) type electrode assembly in which a separator is interposed between a positive electrode and a negative electrode, each of which is provided as the form of a sheet coated with an active material. The positive electrode, the separator, and the negative electrode are wound, a stack type electrode assembly in which a plurality of positive and negative electrodes with a separator therebetween are sequentially stacked. Accordingly a stack or a folding type electrode assembly having a stack type unit cells that are wound with a separation film having a long length is produced. Among them, the layered spherical arrangement type electrode assembly is widely used due its ease of manufacture and high energy density per weight.

The above information disclosed in this section is merely for enhancement of understanding of the background of the disclosure and therefore it may contain information that does not form the prior art that is already known in this country to a person of ordinary skill in the art.

SUMMARY

An aspect of the present disclosure provides a rechargeable battery that may be capable of preventing a layered spiral arrangement (e.g, jelly-roll) type electrode assembly from being unwound and absorbing an impact. According to an aspect of the present disclosure, a rechargeable battery may comprise an electrode assembly having an electrode and a separator alternately stacked and wound, a fixing tape attached to an exterior surface of the electrode assembly and a battery case with the electrode assembly and the fixing tape disposed therein. The fixing tape may comprise a material that is expanded when an electrolyte is impregnated and absorbs an impact in the expanded state to buffer an impact applied to the electrode assembly.

In some exemplary embodiments, the material of the fixing tape may comprise a thermoplastic polyurethane. In other exemplary embodiments, the fixing tape may be attached to the electrode assembly to surround an exterior circumferential surface of the electrode assembly and a margin space may be disposed between the fixing tape and the electrode assembly. In another exemplary embodiment, the fixing tape may be attached to the electrode assembly to surround top and bottom surfaces of the electrode assembly. Additionally, the fixing tape may comprise a base and an adhesion layer disposed on a surface of the base, and the base may be formed from thermoplastic polyurethane.

In some exemplary embodiments, a buffer member may be disposed on an interior circumferential surface of the battery case to buffer the impact applied to the electrode assembly. In other exemplary embodiments, the buffer member may be disposed on a lower end of the battery case. The buffer member may comprise a base and an adhesion layer disposed on a first surface of the base and may be attached to the battery case. The base may be formed from thermoplastic polyurethane that is expanded when the electrolyte is impregnated.

In other exemplary embodiments, the base may comprise a plurality of protrusions that extend towards to a central axis along the interior circumferential surface of the battery case, and the protrusions may be disposed in a longitudinal direction of the battery case. In some exemplary embodiments, protrusions of the buffer member and an exterior surface of the fixing tape may be attached together by being expanded after the electrolyte is impregnated to fix a position of the electrode assembly on the battery case.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
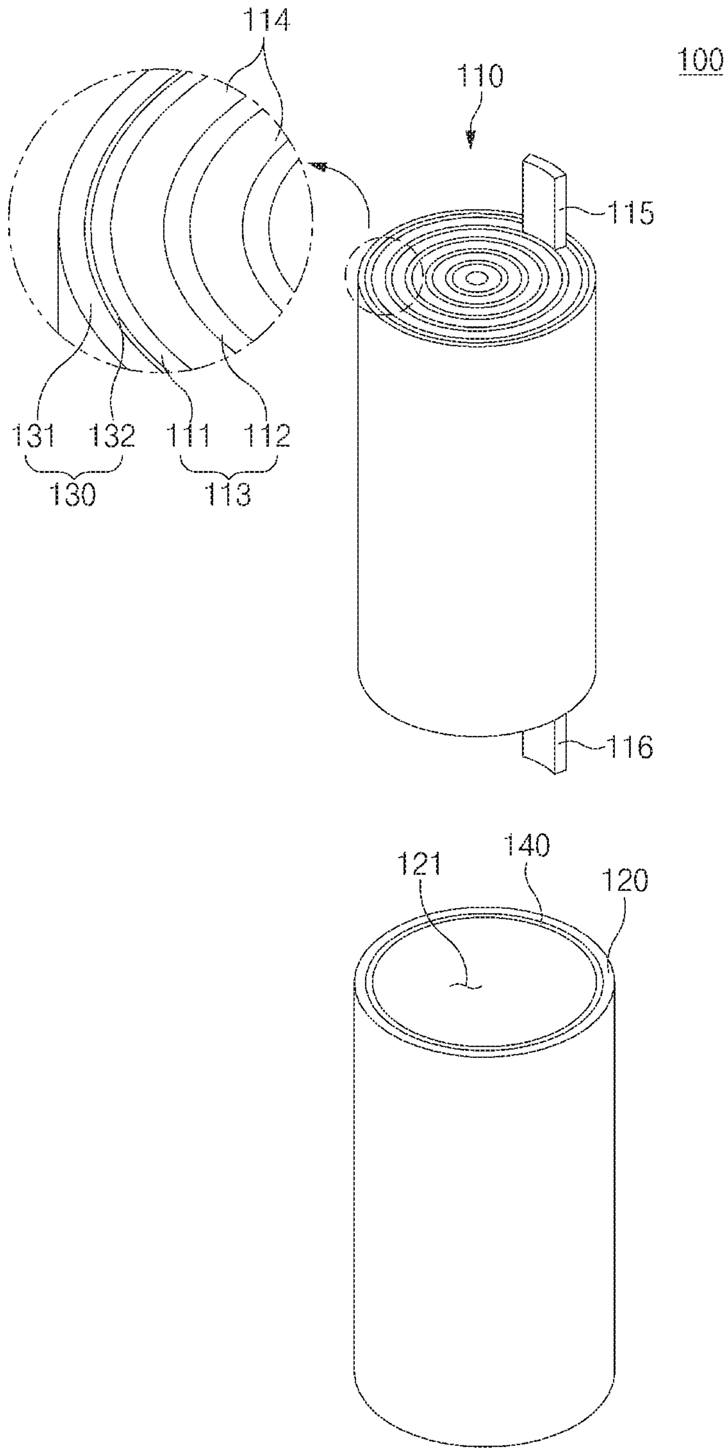
FIG. 1 is an exemplary exploded perspective view of a rechargeable battery according to an exemplary embodiment of the present disclosure.

The objectives, specific advantages, and novel features of the present disclosure will become more apparent from the following detailed description taken in conjunction with the accompanying drawings. It is noted that the same or similar components in the drawings are designated by the same reference numerals as far as possible even if they are shown in different drawings. Also, the present disclosure may be embodied in different forms and should not be construed as limited to the embodiments set forth herein. Moreover, detailed descriptions related to well-known technologies will be ruled out in order not to unnecessarily obscure subject matters of the present disclosure.

Hereinafter, exemplary embodiments of the present disclosure will be described below in more detail with reference to the accompanying drawings. The present disclosure may, however, be embodied in different forms and should not be construed as limited to the exemplary embodiments set forth herein. In describing the exemplary embodiments, thicknesses of lines and dimension of components shown in the drawings may be expressed exaggeratedly for clarity and convenience of description. In addition, terms to be described below are those defined in consideration of functions in the present disclosure, which may vary depending on intention or custom of users or operators. Therefore, definition of these terms should be made based on the contents throughout this specification.

The terminology used herein is for the purpose of describing particular embodiments only and is not intended to be limiting of the disclosure. As used herein, the singular forms "a", "an" and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" comprises any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be understood that, although the terms first, second, etc. may be used herein to describe various elements, these elements should not be limited by these terms. These terms are only used to distinguish one element from another. For example, a first element could be termed a second element, and similarly, a second element could be termed a first element.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value.

Unless otherwise clear from the context, all numerical values provided herein are modified by the term "about." FIG. 1 is an exemplary exploded perspective view of a rechargeable battery according to an exemplary embodiment of the present disclosure. Referring to FIG. 1, a rechargeable battery 100 may comprise an electrode assembly 110, a fixing tape 130 attached to the electrode assembly 110 and a battery case 120 having the electrode assembly 110 and the fixing tape 130 disposed therein. Additionally, the rechargeable battery 100 according to an exemplary embodiment of the present disclosure may further comprise a buffer member 140 disposed within the battery case 120.

Hereinafter, the rechargeable battery 100 according to an exemplary embodiment of the present disclosure will be described in more detail with reference to FIGS. 1 to 3. The electrode assembly 100 may be a chargeable and dischargeable power generating device and may have a structure in which an electrode 113 and a separator are combined and alternately stacked. For example, the electrode assembly 110 may have a wound shape. The electrode 130 may comprise a positive electrode sheet 111 and a negative electrode sheet 112. Additionally, the separator 114 may physically space apart and electrically insulate the positive electrode sheet 111 from the negative electrode sheet 112. In particular, the positive electrode sheet 111 and the negative electrode sheet 112 may be wound together with the separator 114 to form a layered spiral arrangement (e.g., jelly-roll shape). In other words, the electrode assembly 110 may be wound in a circular or oval shape.

The separator 114 may be formed from an insulation material and may be alternatively stacked together with the positive electrode sheet 111 and the negative electrode sheet 112. The separator 114 may be disposed between the positive electrode sheet 111 and the negative electrode sheet 112 on exterior surfaces of the positive electrode sheet 111 and the negative electrode sheet 112. In addition, the separator 114 may be disposed on the outermost portion of the electrode assembly 110 in a width direction when the electrode assembly 110 is wound. Additionally, the separator 114 may be formed from a flexible material. The separator 114 may be formed from a polyolefin-based resin film such as polyethylene or polypropylene having micropores or the like.

Electrode tabs 115 and 116 may be attached to the electrode 113 to electrically connect electrode tabs 115 and 116 to the electrode 113. For example, the electrode tabs 115 and 116 may comprise a positive electrode tab 115 and a negative electrode tab 116. The positive electrode tab 115 may be electrically connected to the positive electrode sheet 111 and the negative electrode tab 116 may be electrically connected to the negative electrode sheet 112.

The fixing table 130 may be attached to an exterior surface of the electrode assembly 110 to prevent the electrode assembly 110 from being unwound. Additionally, the fixing tape 130 may comprise a material may be expanded when an electrolyte is impregnated and absorbs an impact in the expanded state to buffer an impact applied to the electrode assembly 110. The fixing tape 130 may formed from a thermoplastic polyurethane or the like. The fixing tape 130 may be formed from a thermoplastic material to prevent the fixing tape 130 from being cured due to a temperature change in the rechargeable battery 100. Accordingly, a continuous impact reduction effect may be attained regardless of the temperature change in the rechargeable battery 100.

Furthermore, the fixing tape 130 may be attached to the electrode assembly 110 to surround the exterior circumferential surface of the electrode assembly 110. FIG. 1 illustrates a state in which the fixing tape 130 is attached to surround the exterior circumferential surface of the electrode assembly 110, and may prevent the electrode assembly 110 from being unwound and reducing the impact applied to the electrode assembly 110. Although not shown in the drawings, according to another exemplary embodiment of the present disclosure, a margin space may be provided between the fixing tape 130 and the electrode assembly 110. In particular, an expansion cavity for the electrode assembly 110 and the fixing tape 130, that may be expanded by the impregnation of the electrolyte and the repetitive charging and discharging, may be secured. Additionally, the fixing tape 130 may comprise a base 131 and an adhesion layer 132 disposed on a first surface of the base 131. The base 131 may be formed from a thermoplastic polyurethane or the like.

Figure 2:
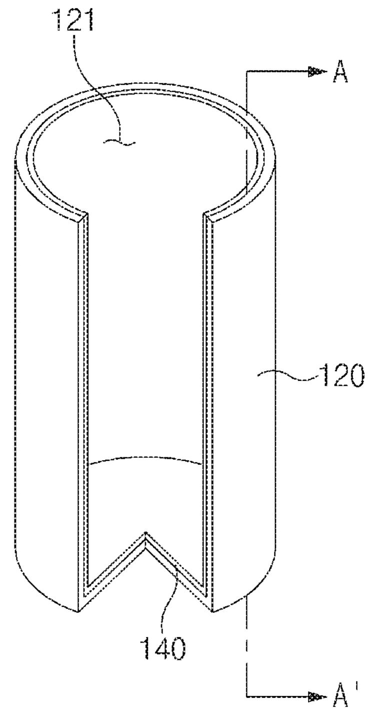
FIG. 2 is an exemplary perspective view illustrating a state in which a portion of a battery case is cut in the rechargeable battery according to an exemplary embodiment of the present disclosure.

FIG. 2 is an exemplary perspective view illustrating when a portion of the battery case is cut in the rechargeable battery according to an exemplary embodiment of the present disclosure. FIG. 3 is an exemplary cross-sectional view illustrating a portion of the part cut along a line A-A' in FIG. 3. Referring to FIGS. 1 and 2, the battery case 120 may comprise an accommodation part 121, that receives the electrolyte, the electrode assembly 110 and the fixing tape. Additionally, the battery case 120 may have a cylindrical shape or the like. For example, the battery case 120 may have a first side that is opened and a second side that is closed. The battery case 120 may comprise a cap (not shown) for closing the opened side thereof.

The buffer member 140 may be disposed on an interior circumferential surface of the battery case 120 to reduce the impact applied to the electrode assembly 110 when collision of the electrode assembly 110 occurs. Accordingly, the fixing table 130 and the buffer member 140 may doubly buffer the impact applied to the electrode assembly 110. For example, the buffer member 140 may be disposed on a bottom surface of the accommodation part 121 of the electrode assembly 110.

Figure 3:
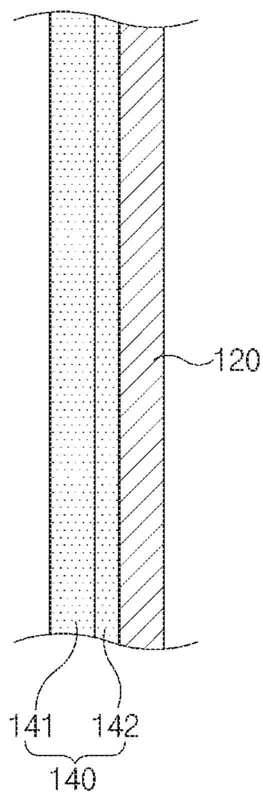
FIG. 3 is an exemplary cross-sectional view illustrating a portion of the part cut along a line A-A' in FIG. 3 according to an exemplary embodiment of the present disclosure.

Additionally, referring to FIG. 3, the buffer member 140 may comprise a base 141 and an adhesion layer 142 disposed on one surface of the base 141 and may be attached to the battery case 120. The base 141 may be formed from a thermoplastic polyurethane that is expanded when the electrolyte is impregnated.

Figure 4:
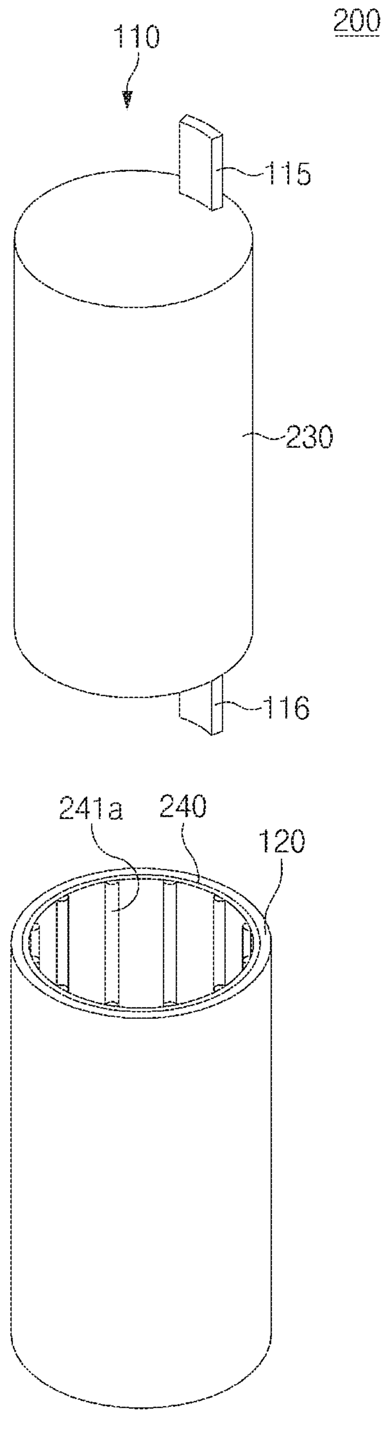
FIG. 4 is an exemplary exploded perspective view of a rechargeable battery according to another exemplary embodiment of the present disclosure.
Figure 5:
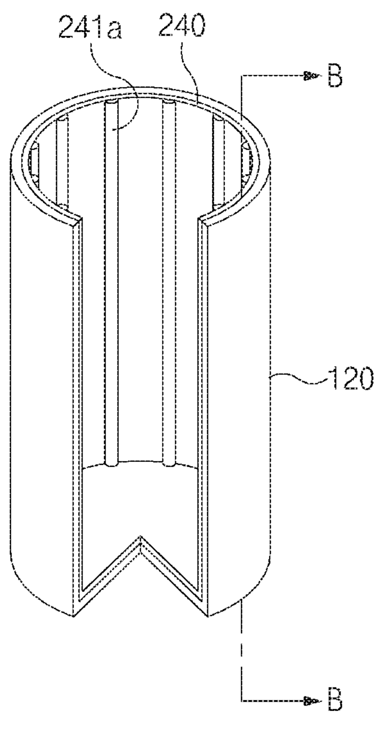
FIG. 5 is an exemplary perspective view illustrating a state in which a portion of a battery case is cut in the rechargeable battery according to another exemplary embodiment of the present disclosure.
Figure 6:
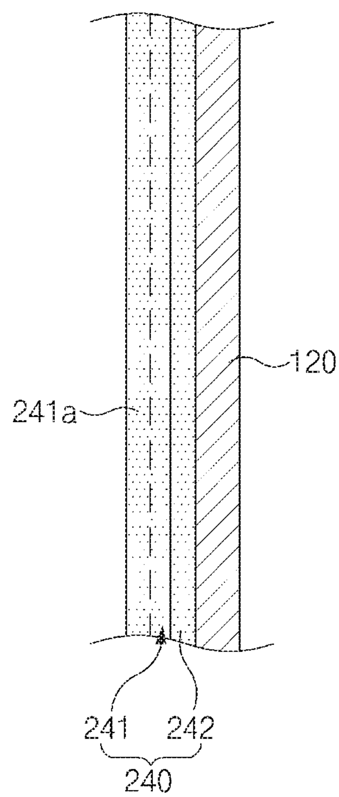
FIG. 6 is an exemplary cross-sectional view illustrating a portion of the part cut along a ling B-B' in FIG. 5 according to an exemplary embodiment of the present disclosure.

FIG. 4 is an exemplary exploded perspective view of a rechargeable battery according to another exemplary embodiment of the present disclosure. FIG. 5 is an exemplary perspective view illustrating a state in which a portion of a battery case is cut in the rechargeable battery according to another exemplary embodiment of the present disclosure. FIG. 6 is an exemplary cross-sectional view illustrating a portion of the part cut along a line B-B' in FIG. 5. Referring to FIG. 4, a rechargeable battery 200 according to another exemplary embodiment of the present disclosure may comprise an electrode assembly 110, a fixing tape 230 attached to the electrode assembly 110, a battery case 120, and a buffer member 240 provided in the battery case 120.

The rechargeable battery 200 according to another exemplary embodiment of the present disclosure is different from the rechargeable battery 100 according to the foregoing embodiment in that a protrusion 241*a* may be disposed on the buffer member 240, the fixing tape 230 may be disposed on each of top and bottom surfaces of the electrode assembly 110. In other words in an exemplary embodiment, contents duplicated with those of the foregoing embodiment may be briefly described and a difference therebetween may be mainly described. In more detail, the fixing tape 230 may be attached to the electrode assembly 110 to surround the top and bottom surfaces and an exterior circumferential surface of the electrode assembly 110. Accordingly, an impact applied to a side surface and a lower portion of the electrode assembly 110 may be buffered.

Referring to FIGS. 5 and 6, the buffer member 240 may comprise a base 241 and an adhesion layer 242 disposed on a first surface of the base 241. Additionally, the buffer member 240 may be attached to an interior circumferential surface of the battery case 120. Accordingly, an impact applied to the electrode assembly 110 may be doubly buffered.

Furthermore, the base 241 may comprise a plurality of protrusions 241*a* that extend to a central axis along the interior circumferential surface of the battery case 120. In particular, each of the protrusions 241*a* may have a line shape in a longitudinal direction of the battery case 120. In other words, the impact applied to the electrode assembly 110 may be better absorbed and a cavity that accommodates an electrolyte may be secured between the protrusions 241*a* to allow the electrolyte to be impregnated up to an end of the electrode assembly 110. Particularly, the fixing tape 230 and the buffer member 240 may be expanded before the electrolyte is impregnated up to a lower portion of the electrode assembly 110. Accordingly, the electrolyte may be uniformly impregnated up to the lower portion of the electrode assembly 110.

Additionally, for another exemplary embodiment, the buffer member 240 may be disposed on the interior circumferential surface and a bottom surface of the battery case 120. A portion of the buffer member 240, which is disposed on the interior circumferential surface of the battery case 120, may comprise the protrusions 241*a* and a portion of the buffer member 20, disposed on the bottom surface of the battery case 120 may be have a planer arrangement (e.g., flat) without comprising the protrusions 241*a*.

Referring to FIG. 4, when the protrusions 241*a* of the buffer member 240 and an exterior surface of the fixing tape 230 are attached to each other by expansion after the electrolyte is impregnated, a position of the electrode assembly 110 may be fixed on the battery case 120. According to the present disclosure, the fixing tape may be attached to prevent the electrode assembly from being unwound and the material may absorb the impact to buffer the impact applied to the electrode assembly.

Particularly, the fixing tape may comprise the thermoplastic polyurethane and may be expanded when the electrolyte is impregnated and absorb the impact in the expanded state. Accordingly, more effectively buffering of the impact applied to the electrode assembly may occur. Additionally, the buffer member may be further provided on the interior circumferential surface of the battery case to buffer the impact applied to the electrode assembly.

Although the present disclosure has been described in detail with reference to the exemplary embodiments, this is merely an example for particularly describing the present disclosure, and thus, the rechargeable battery according to the present disclosure is not limited thereto. It will be understood by those skilled in the art that various changes in form and details may be made therein without departing from the spirit and scope of the disclosure. Also, the specific scope of protection of the disclosure will be apparent from the appended claims.

What is claimed is:

1. A rechargeable battery comprising:

an electrode assembly having an electrode and a separator that are alternately stacked and wound;

a fixing tape attached to an exterior surface of the electrode assembly to prevent the electrode assembly from being unwound;

a battery case configured to receive the electrode assembly and the fixing tape attached thereto; and a buffer member including a plurality of protrusions, wherein the buffer member is disposed between the electrode assembly and the battery case, wherein the protrusions of the buffer member extend toward an inside of the battery case, wherein each of the buffer member and the fixing tape comprises a material configured to absorb an impact applied to the electrode assembly, and wherein the buffer member comprises a base and an adhesion layer disposed on a first surface of the base and is attached to the battery case.

2. The rechargeable battery of claim 1, wherein the material of the fixing tape comprises a thermoplastic polyurethane.

3. The rechargeable battery of claim 1, wherein the fixing tape is attached to the electrode assembly to surround an exterior circumferential surface of the electrode assembly, and a margin space is disposed between the fixing tape and the electrode assembly.

4. The rechargeable battery of claim 1, wherein the fixing tape is attached to the electrode assembly to surround top and bottom surfaces and an outer circumferential surface of the electrode assembly.

5. The rechargeable battery of claim 1, wherein the fixing tape comprises a base and an adhesion layer disposed on a surface of the base, and the base is formed from thermoplastic polyurethane.

6. The rechargeable battery of claim 1, wherein the buffer member is disposed on an interior circumferential surface of the battery case to buffer the impact applied to the electrode assembly.

7. The rechargeable battery of claim 1, wherein the base is formed from thermoplastic polyurethane that is expanded when an electrolyte is impregnated.

8. The rechargeable battery of claim 7, wherein the base comprises the plurality of protrusions extending toward a central axis along the interior circumferential surface of the battery case, and the protrusions are disposed in a longitudinal direction of the battery case.

9. The rechargeable battery of claim 8, wherein the protrusions of the buffer member and an exterior surface of the fixing tape are closely attached to each other by being expanded after the electrolyte is impregnated to fix a position of the electrode assembly on the battery case.

10. The rechargeable battery of claim 1, wherein the fixing tape comprises a material configured to expand when impregnated with an electrolyte.

* * * * *